Feb. 19, 1924.
J. PICCIRILLI
1,484,359
SAFETY SEAL ENVELOPE
Filed Nov. 17, 1921   2 Sheets-Sheet 1
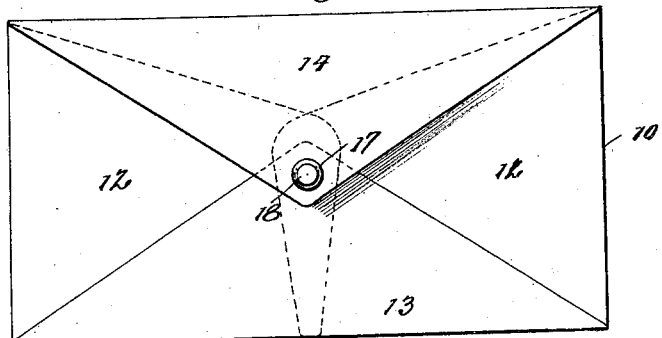
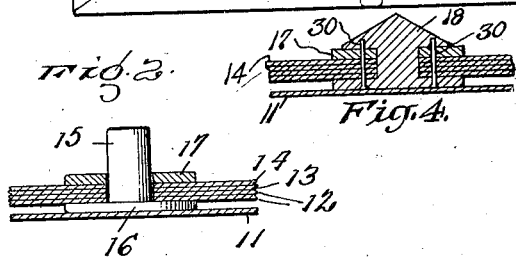
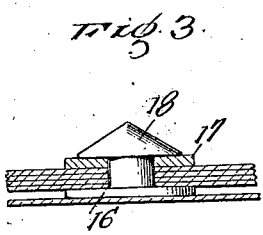
Joseph Piccirilli
INVENTOR
BY   ATTORNEY Feb. 19, 1924.  1,484,359
J. PICCIRILLI
SAFETY SEAL ENVELOPE
Filed Nov. 17, 1921  2 Sheets-Sheet 2

Joseph Piccirilli
INVENTOR

BY  ATTORNEY

Patented Feb. 19, 1924.

1,484,359

UNITED STATES PATENT OFFICE.

JOSEPH PICCIRILLI, OF PLAINFIELD, NEW JERSEY.

SAFETY-SEAL ENVELOPE.

Application filed November 17, 1921. Serial No. 515,926.

*To all whom it may concern:*

Be it known that I, JOSEPH PICCIRILLI, a subject of the King of Italy (having declared his intention to become a citizen of the United States), residing at Plainfield, in the county of Union and State of New Jersey, have invented certain new and useful Improvements in Safety-Seal Envelopes, of which the following is a specification.

This invention has relation to safety envelopes and has for an object to provide a novel means for sealing together the flaps and body portion of an envelope so as to prevent the release of the flap or opening of the envelope without detection.

Another object of the invention is to provide a device for sealing envelopes which includes a soft metal stud designed to be inserted through openings in the flap and body portion of the envelope, and to be deformed or upset subsequently thereto by any suitable means, thus providing in effect a rivet which will securely hold the flap in place and which cannot be dislodged without destroying the rivet or mutilating the envelope.

In addition to the foregoing this invention comprehends improvements in the details of construction and arrangement of parts to be hereinafter described and particularly set forth in the appended claim.

In the accompanying drawings in which similar and corresponding parts are designated by the same characters of reference throughout the several views in which they appear:

Figure 1 is a view in elevation of the rear face of an envelope illustrating the application thereto of my invention.

Figure 2 is a detailed view in section on an enlarged scale showing the stud in place before the same is deformed.

Figure 3 is a similar view showing the stud deformed to complete the sealing.

Figure 4 is a detailed view in section of a soft metal stud showing the manner in which means may be provided to prevent relation motion of the stud and envelope part.

Figure 5:
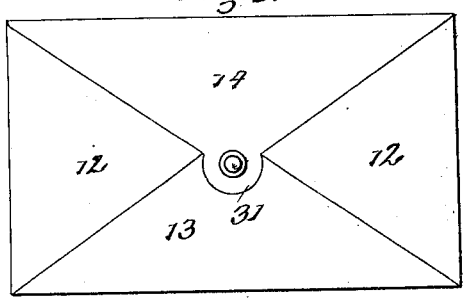
Figures 5 to 9 illustrate views in elevation of envelopes, each sealed with different numbers of seals in various arrangements.

With reference to the drawings, 10 indicates generally an envelope comprising the front wall 11, end flaps 12, lower flap 13 and upper flap 14, the latter being usually gummed. Said flaps are designed to overlap one another as shown. The device consists of a soft metal stud 15 having a flat head 16. The head 16 is adapted to be disposed between the wall 11 and flap 12 of the envelope, and the stud to project through opening in the flaps 12, 13 and 14, as shown in Figure 2. A steel washer 17 is then placed over the stud permitting a portion of the latter to project beyond the washer. The device is now placed beneath a steel press of any desired construction which is adapted to deform the projecting portion of the stud 15 so as to form a conical head 18 as shown in Figure 3. The flaps are now sealed and may not be disengaged without destroying the stud by removing the head, or without mutilating the envelope itself.

I have illustrated a modified arrangement in Figure 4 which is similar in all respects to the construction shown in Figures 1, 2 and 3 with the exception that a pair of pins 30 are inserted through the head 16 and are designed to penetrate the flaps 12, 13 and 14 of the envelope, the washer 17 and to be imbedded in the head 18 when the latter is formed by the steel press. In this manner the stud is held against rotation relative to the flaps of the envelope and a much stronger construction is thus provided. Any attempt to slide the stud or washer through the openings in the flap in a surreptitious manner to be subsequently replaced is absolutely prevented by reason of the pins 30. It will be seen that during the act of sealing the device the name of the sender may be impressed upon the head 18 or other parts, thus preventing the envelope from being opened and resealed with a similar device. Also, the washers 17 may be supplied with the name of the sender engraved thereon.

Figure 6:
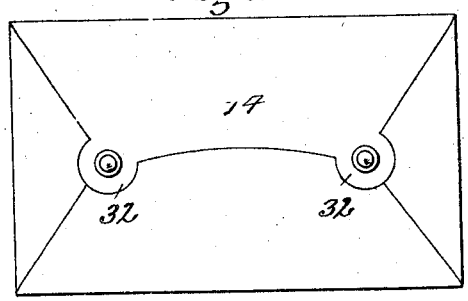
Figure 7:
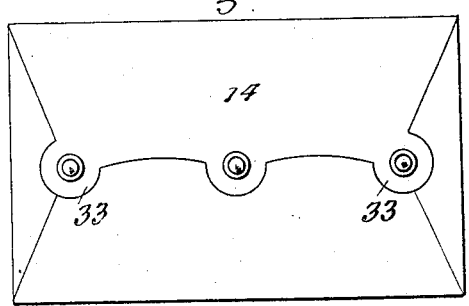
Figure 8:
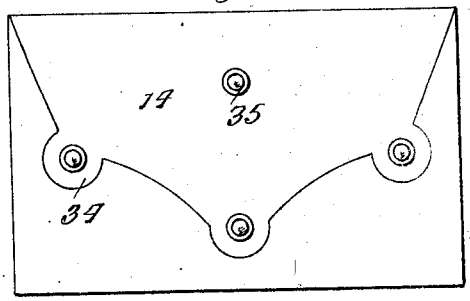
Figure 9:
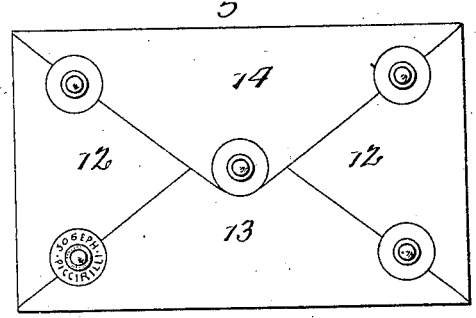
Figure 10:
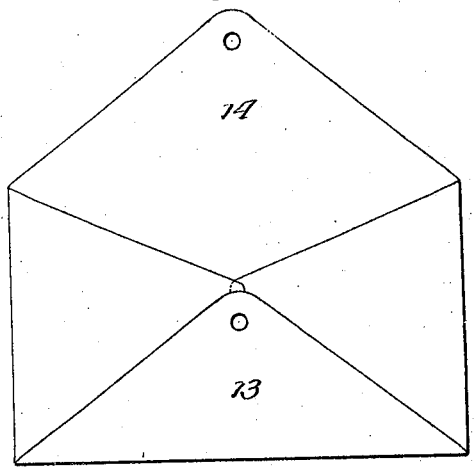
Figure 10 is a view of an envelope for use in connection with a correspondence card.
Figure 11:
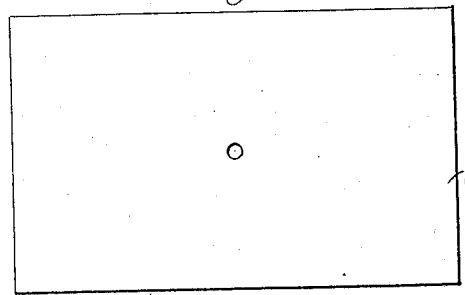
Figure 11 is a view of a correspondence card as used in connection with the type of envelope shown in Figure 10.

In Figure 5 I have illustrated a form of envelope designed particularly for use in connection with my seals, and to that end the flap 14 is formed with a semi-circular integral extension 31 in the center of which the stud 15 of the seal is placed after said stud has penetrated the other flaps 12 and 13. In Figure 6 is shown a form of envelope designed to be closed with two seals and a pair of semi-circular extensions 32 are formed on the flap 14, one at each end in which the seal studs are inserted. This form of envelope is more resistant to any efforts that may be made to withdraw its contents by partly disengaging the flap. A still more secure form of envelope is shown in Figure 7 in which three extensions 33 are formed on the flap 14 at the center of the latter and at each end. The form shown in Figure 8 provides, in additon to three extensions 34 on the flap 14, a fourth seal 35 which penetrates the flap 14 at a point between the tip of said flap on the edge of the envelope to which said flap is attached. In Figure 9 I have illustrated a method of sealing an envelope with five seals, arranged in uniform spaced relation around the edges of the envelope and in the center, the marginal seals being located partly on the flaps 14 and 12 and partly on the flaps 12 and 13. In sealing this form of envelope it is desirable that a form of seal press be employed which is adapted to print the name of the sealer in a circle around the seal. In this manner the possibility of the envelope being opened and resealed by an unauthorized party is rendered more remote. In Figures 10 and 11 I have illustrated a method of sealing an envelope which will prevent the withdrawal therefrom of the message sheet. This is accomplished by inserting the sealing stud through the message sheet 36 and then through the flaps 13 and 14 of the envelope.

Thus, it will be seen that I have provided a means which will absolutely and positively prevent the opening of an envelope without detection and in which the use of heat, as when using sealing wax, is avoided. Other advantages will be readily apparent.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claim.

Having thus described my invention, what I claim as new and desire to secure by United States Letters Patent is:—

In combination, an envelope including a front wall, upper, lower and end flaps attached thereto, said flaps having openings therein at the meeting edges of the respective flaps, a soft metal stud to be inserted through said openings, a flat head at one end of the stud to be inserted between the front wall of the envelope and said flaps, a washer to be inserted over the stud, pins extended through the head, flaps, and washer, said projecting end of the stud designed to be upset to form a head and to receive the ends of the pins.

In testimony whereof I affix my signature in presence of a witness.

JOSEPH PICCIRILLI. [L. S.]

Witness:
WM. ZEAMAN.